United States Patent
Seong et al.

(10) Patent No.: US 6,587,481 B1
(45) Date of Patent: Jul. 1, 2003

(54) LIGHT EMITTING MODULE AND COMPATIBLE OPTICAL PICKUP DEVICE ADOPTING THE SAME

(75) Inventors: Pyong-yong Seong, Seoul (KR); Yong-jae Lee, Suwon (KR); Byung-ryul Ryoo, Suwon (KR); Yong-ki Son, Suwon (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/552,621

(22) Filed: Apr. 19, 2000

(30) Foreign Application Priority Data

Apr. 19, 1999 (KR) .......................... 99/13806
Jul. 20, 1999 (KR) .......................... 99/29279

(51) Int. Cl.$^7$ ................................. H01S 3/10
(52) U.S. Cl. ................ 372/9; 372/36.01; 372/29.011; 372/101; 369/112
(58) Field of Search ................ 372/101, 29.011

(56) References Cited

U.S. PATENT DOCUMENTS

| 5,247,167 A | 9/1993 | Bargerhuff et al. ........ 250/208 |
| 5,553,050 A | 9/1996 | Yang | |

(List continued on next page.)

FOREIGN PATENT DOCUMENTS

| EP | 0 786 836 | 7/1997 |
| EP | 0 810 589 | 12/1997 |
| EP | 0 973 160 | 1/2000 |
| JP | 04-199890 | 7/1992 |
| JP | 05-121838 | 5/1993 |
| JP | 6-164056 | 6/1994 |
| JP | 9-320098 | 12/1997 |
| JP | 10-11795 | 1/1998 |
| JP | 10-149559 | 2/1998 |
| JP | 10-64107 | 3/1998 |
| JP | 10-149559 | 6/1998 |
| JP | 10-172168 | 6/1998 |
| JP | 11-97804 | 4/1999 |
| WO | WO 00/04614 | 1/2000 |

OTHER PUBLICATIONS

Japanese Patent Office Action in corresponding co-pending Serial No. 2000–116992, issue No. 129000 dated Apr. 30, 2002.

*Primary Examiner*—Paul Ip
*Assistant Examiner*—Armando Rodriguez
(74) *Attorney, Agent, or Firm*—Robert E. Bushnell, Esq.

(57) ABSTRACT

A light emitting module packaging two light sources emitting two light beams of different wavelengths, and a compatible optical pickup device adopting the module are provided. The light emitting module includes a base, first and second light sources installed on the base, for emitting laser beams in different wavelength regions, a beam splitter and a monitoring photodetector for monitoring the optical outputs of the first and second light sources by receiving the beams emitted from the first and second light sources and split from the beam splitter in one direction. Also, another light emitting module includes a substrate, first and second light sources installed on the substrate for emitting laser beams of first and second wavelengths from both lateral sides thereof, a reflection member for reflecting the laser beam emitted from one lateral side of each of the first and second light sources to proceed in one direction, and first and second monitoring photodetectors for monitoring optical outputs of the first and second light sources. The compatible optical pickup device includes the light emitting module having the above structure, an objective lens for focusing first and second laser beams on an optical recording medium, an optical path converting device, a grating arranged on an optical path between the light emitting module and the optical path converting device for diffracting and transmitting an incident light, a photodetector.

22 Claims, 8 Drawing Sheets

U.S. PATENT DOCUMENTS

| | | | |
|---|---|---|---|
| 5,598,394 A | * 1/1997 | Hibino et al. | 369/112 |
| 5,734,637 A | 3/1998 | Ootaki et al. | |
| 5,742,575 A | 4/1998 | Yamakawa et al. | |
| 5,748,602 A | 5/1998 | Chao et al. | |
| 5,831,952 A | 11/1998 | Yamada et al. | |
| 5,889,748 A | 3/1999 | Shimano et al. | |
| 5,901,125 A | 5/1999 | Doi | |
| 5,905,707 A | 5/1999 | Ju et al. | |
| 5,974,020 A | 10/1999 | Ju et al. | |
| 6,084,843 A | * 7/2000 | Abe et al. | 369/112 |
| 6,211,511 B1 | * 4/2001 | Shih et al. | 250/214 |
| 6,301,216 B1 | * 10/2001 | Takahashi | 369/112.28 |

* cited by examiner

LIGHT EMITTING MODULE AND COMPATIBLE OPTICAL PICKUP DEVICE ADOPTING THE SAME

CLAIM OF PRIORITY

This application makes reference to, incorporates the same herein, and claims all benefits accruing under 35 U.S.C. §119 from my two applications entitled *Light Emitting Module And Compatible Optical Pickup Device Adopting The Same*, respectively filed with the Korean Industrial Property Office on the 19$^{th}$ day of April 1999 and there duly assigned Ser. No. 13806/1999, and on the 20$^{th}$ day of July 1999 and there duly assigned Ser. No. 29279/1999.

BACKGROUND OF THE INVENTION

1. Field of the Invention

The present invention relates to a light emitting module for emitting a laser light beam and a compatible optical pickup device conforming to the light emitting module, and more particularly, to a light emitting module in which two light sources respectively emitting two light beams of different wavelengths are packaged into a single module, and to a compatible optical pickup device conforming to the light emitting module so that recording media of different formats can be compatibly used.

2. Description of the Related Art

DVD players and DVD-ROM drives are noted in the video and audio field for their high density recording/reproducing capabilities. Optical pickup devices are typically used in compact disk (i.e., CD) players, CD-ROM drives, digital versatile disk (i.e., DVD) players, and DVD-ROM drives to record information onto and to read and reproduce information from the recording medium in a non-contact manner (i.e., the head writes and reads information without touching the surface of the recording medium). To provide compatibility, an optical pickup device that is incorporated into a DVD player should be able to record onto and reproduce information from not only DVDs, but also the compact disk family of recordable media such as CDs, CD-Rs (i.e., CD-recordable), CD-RWs (i.e., CD-rewritable), CD-Is (i.e., CD-interactive) and CD-Gs (i.e., CD graphics). The thickness of a DVD is standardized by a different specification than the thickness of other recordable media within the CD family due to the allowance of error in disk inclination and the numerical aperture of the objective lens. That is, the thickness of the disk for the existing family of compact disks is 1.2 millimeters while the thickness of a DVD is 0.6 millimeters. When an optical pickup device that is designed for a DVD is used for with a recordable medium from the CD family, spherical aberration occurs due to this significant difference in thicknesses. The spherical aberration not only reduces the intensity of light to levels that are insufficient in intensity to record information signals, but also causes a deterioration of the signals that are read from the recording medium.

DVD's are standardized differently from the CD family of recordable media. The wavelength of a reproduction light source for the existing family of compact disks is about 780 nanometers while the wavelength of a reproduction light source for a DVD is about 650 nanometers. Thus, typical CD players are not able to reproduce information that has been recorded on a DVD due to differences in the wavelengths of the light used for reproduction and the occurrence of spherical aberration. We have noticed that there is a need to develop abetter optical pickup device for DVDs, and to make optical pickup devices for DVDs compatible with the existing family of compact disks.

To solve the above problems, recent efforts in the art, some of which are described in detail below in conjunction with FIGS. 1 and 2, to provide a conventional compatible optical pickup device are apt to use one optical module emitting a light ray having a 650 nm wavelength toward a relatively thin disk such as a DVD, and a second optical module emitting a light ray having a 780 nm wavelength toward a relatively thick disk such as a compact disk with the CD family of media disks. These efforts have sought to construct compatible pickups with two discrete, separately sited and individually adjustable first and second optical modules that are aligned with a photodetector. The photodetector must be adjusted so that reproduction of servo and radio frequency signals is possible. One optical module is set to emit light at a 650 nm wavelength and to direct that light to be reflected by an optical disk after passing one, or more, beam splitters and an objective lens, towards a photodetector. Then, the other optical module is adjusted so that the light being emitted is reflected by the optical disk and then accurately focused onto the photodetector. We have observed that conventional compatible optical pickup devices are deficient in several aspects. First, at least one of the first optical module, the second optical module and the photodetector must be adjusted. Consequently, assembly of optical pickups is inconvenient and the rate of defects attributable to the assembly increases. Second, miniaturization of the optical pickup is difficult because the first and second optical modules are in separate locations. Third, two monitoring photodetectors are necessary to adjust the optical output of each light source; this unduly complicates the wiring of the accompanying circuit.

SUMMARY OF THE INVENTION

Accordingly, it is an object to the present invention to provide an improved light emitting process and structure.

It is another object to provide a light emitting process that facilitates compatible optical communication with different formats between an emitter and photodetector. for so that recording media of different formats can be compatibly used.

It is still another object to provide a light emitting process, light emitter and photodetector that facilitates optical communication enabling compatible use of recording media with different formats.

It is yet another object to provide a light emitting module having an improved structure and simplified optical configuration, with a reduction in the number of parts, and a compatible optical pickup device compatible with the module.

It is a further object to provide an optical process and apparatus able to reproduce information from both the family of contemporary compact disks and with digital versatile disks.

It is a still further object to provide an optical process and apparatus that is compatible with the different wavelengths used to read information stored on different types of recordable media, while minimizing the affects of spherical aberration.

It is a yet further object to provide an optical process and apparatus that maybe miniaturized, and that lends itself to easy, error-free assembly.

These and other objects maybe attained with a light emitting module constructed with abase, first and second emitting light sources installed on the base that emit laser beams in different wavelength regions, and a beam splitter that divides the beams emitted from the first and second light sources. A photodetector monitors the optical outputs from the first and second light sources by receiving the beams emitted from the first and second light sources after their division by the beam splitter.

The principles of the present invention also contemplate a compatible optical pickup device that may be constructed with a light emitting module constructed with a base, first and second light emitting sources installed on the base that emit laser beams in different wavelength regions, a beam splitter that divides the beams emitted from the first and second light sources, and a monitoring photodetector that receives the beams from the first and second light sources via the beam splitter. An objective lens disposed with the optical path between the light emitting module and an optical recording medium, focuses the beams emitted from the first and second light sources onto the optical recording medium, and an optical path converting device that is disposed within the optical path between the light emitting module and the objective lens, converts the proceeding path of an incident beam. A photodetector receives the beams that are emitted from the first and second light sources, reflected from the optical recording medium and input via the optical path converting device.

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
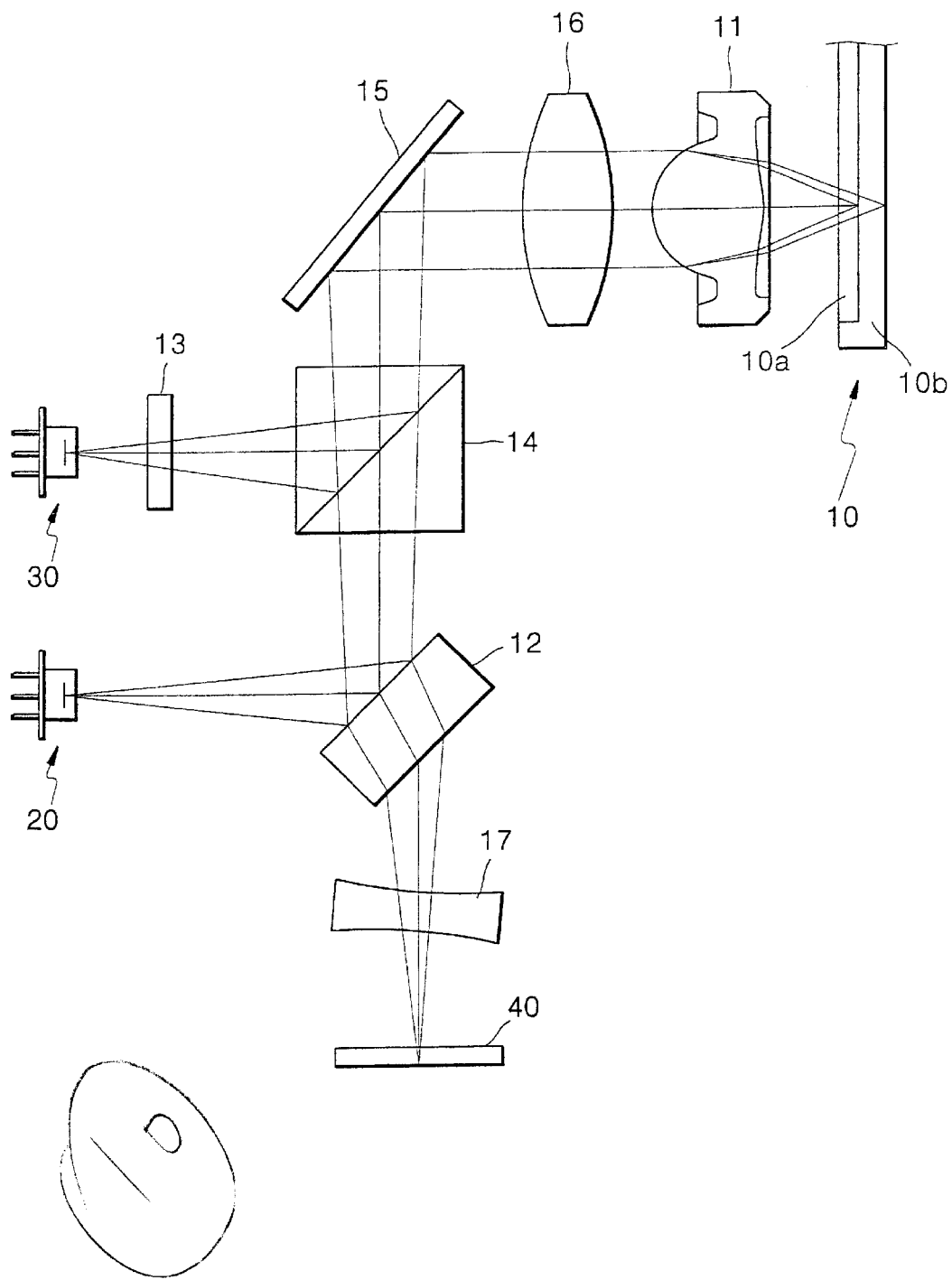
FIG. 1 is a view showing the optical arrangement of one effort to construct a compatible optical pickup device.

Turning now to the drawings, FIG. 1 illustrates one effort in the art that has proposed a compatible optical pickup device, that was constructed with a first optical module 20 that emits a light ray having a 650 nanometer wavelength, a second optical module 30 that emits a light ray having a 780 nanometer wavelength, and first and second beam splitters 12 and 14 that change the paths of travel of the light rays emitted from first and second optical modules 20 and 30, respectively. An objective lens 11 focuses an incident ray on a recordable disk 10. Optical detector receives light that has been reflected by disk 10 that passed successively through the second beam splitter 14 and the first beam splitter 12. In this effort, first optical module 20 was intended to provide light for a relatively thin disk 10a, such as a DVD, and second optical module 30 was intended to provide light for a relatively thick disk 10b, such as a compact disk within the CD family.

Figure 2:
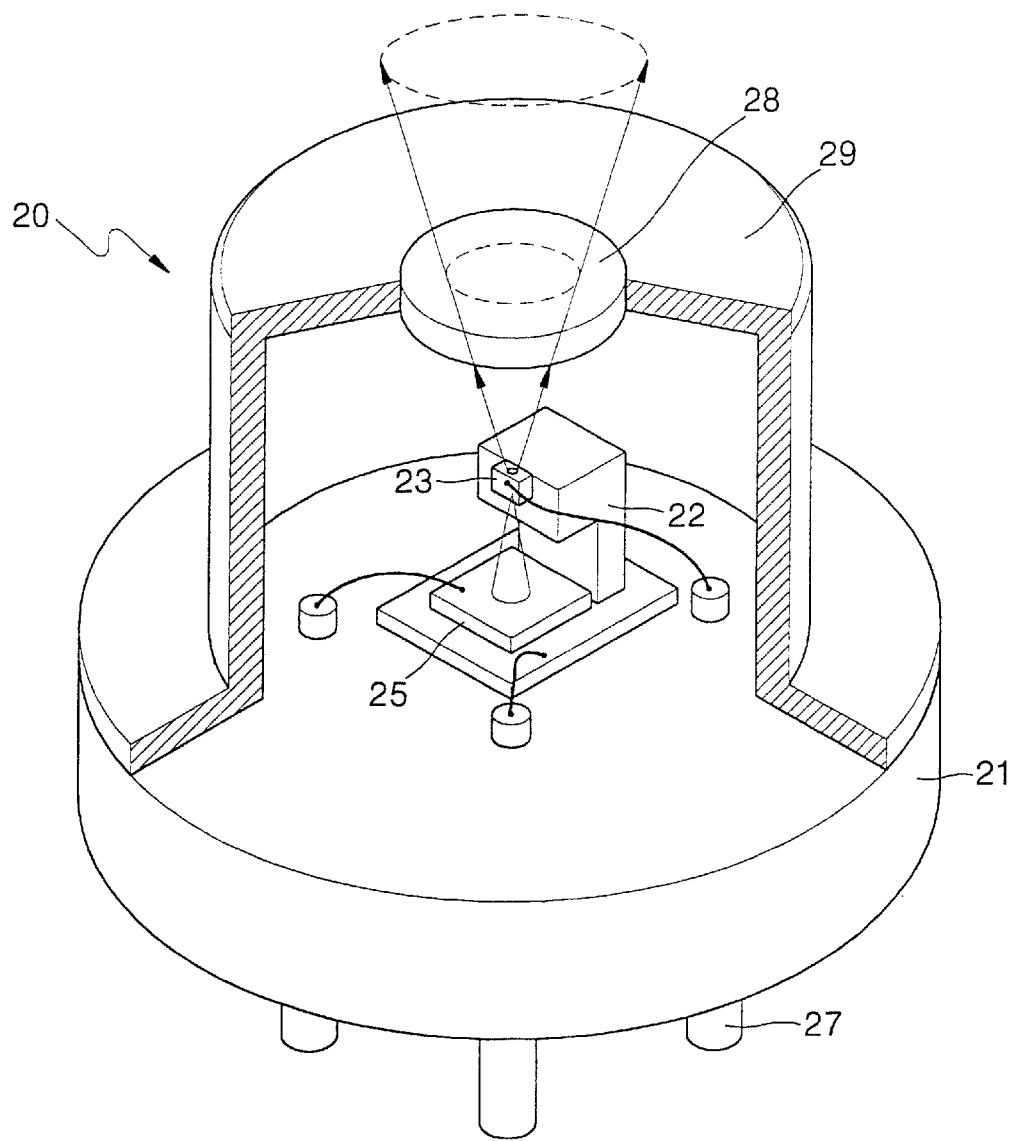
FIG. 2 is a perspective view showing the first light emitting module incorporated into the optical pickup device shown in FIG. 1.

The first optical module 20, as shown in FIG. 2, includes a base 21 where a plurality of exterior lead pins 27 are installed, a heat sink 22 installed on base 21, a light source 23 mounted on the surface of one side of heat sink 22, a photodetector 25 that monitors the optical output of light source 23 is positioned between light source 23 and base 21 to receive the light emitted from the rear of light source 23, and a can 29 having a projection window 28 emitted from the opposite end of light source 23. Can 29 encompasses light source 23 and photodetector 25. There is a need to restrict the value of the upper limit on the rate of reflection from light source 23 to about 50–60%, when considering the optical output from the rear side of light source 23, because photodetector 25 uses the light emitted from the rear of light source 23.

The structure of the second optical module 30 is substantially the same as that of the first optical model 20, and further detail describing module 30 is unnecessary, except to note that second optical module 30 emits a light beam with a wavelength of about 780 nanometers. First beam splitter 12 has a flat rectangular structure that reflects the light emitted from first optical module 20 towards second beam splitter 14. Second beam splitter 14 has a cubic structure with an oblique, partially mirrored interior surface that is able to partially transmit and partially reflect the incident light.

The light emitted from first optical module 20 travels toward second beam splitter 14 after being reflected by first beam splitter 12, and proceeds toward optical disk 10. Light emitted from first optical module 30 is reflected by second beam splitter 14 and focused by objective lens 11, to ultimately impinge on optical disk 10.

Grating 13, which diffracts the incident light emanating from second optical module 30, is positioned between second optical module 30 and second beam splitter 14. A mirror 15 that reflects the incident light and a collimating lens 16 that focuses the incident light, are arranged along an optical path between the second beam splitter 14 and the objective lens 11. The light emitted from first optical module 20 is reflected by disk 10a, which is relatively thinner, and received by photodetector 40. The light emitted from second optical module 30 is reflected by disk 10b, which is relatively thicker, and received by photodetector 40. That is, the radio frequency (i.e., RF) signals of the light emitted from first and second optical modules 20, 30 is detected by a single photodetector 40. A sensor lens 17 is positioned between first beam splitter 12 and photodetector 40.

A compatible pickup device constructed with the structure shown by FIGS. 1 and 2 requires adjustment of first and second optical modules 20, 30 and photodetector 40. First, photodetector 40 is adjusted so that reproduction of servo and radio frequency signals is possible by fixing the first optical module 20 including semiconductor laser 23, to emit light at a 650 nm wavelength and directing the light emitted from first optical module 20 and reflected by optical disk 10 after passing first and second beam splitters 12, 14 and objective lens 11, toward photodetector 40. Then, the second optical module 30 is adjusted so that the light emitted from second optical module 30 and reflected by optical disk 10, will be accurately focused onto photodetector 40.

We have observed that conventional compatible optical pickup devices are deficient in several aspects. First, at least one of the first optical module, the second optical module and the photodetector must be adjusted. Consequently, assembly of optical pickups is inconvenient and the rate of defects attributable to the assembly increases. Second, miniaturization of the optical pickup is difficult because the first and second optical modules are in separate locations. Third, two monitoring photodetectors are necessary to adjust the optical output of each light source; this unduly complicates the wiring of the accompanying circuit.

Figure 3:
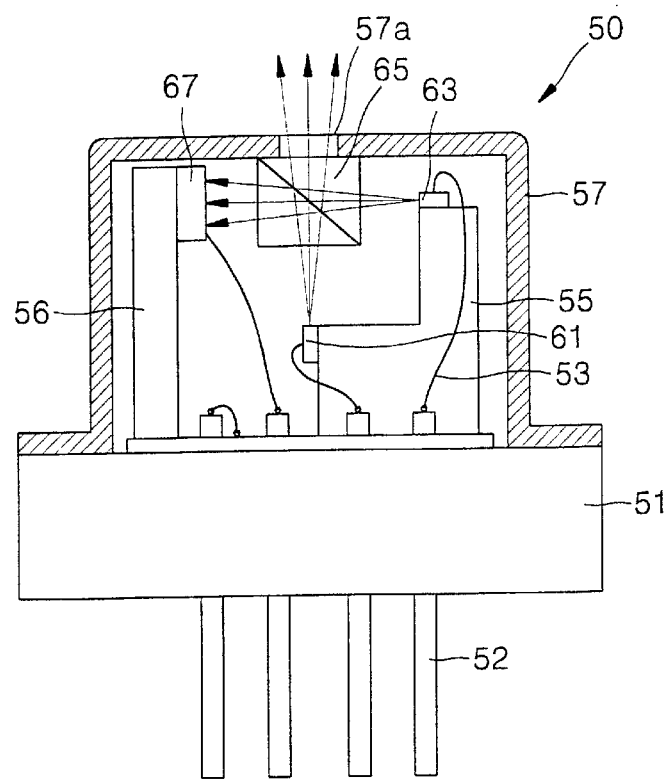
FIG. 3 is a plan view showing the optical arrangement of a light emitting module constructed according to the principles of the present invention as a first embodiment of the present invention.

Referring now to FIG. 3, a light emitting module 50 may be constructed according to the principles of the present invention with a base 51, and discrete and separately positioned first and second light sources 61, 63 are mounted on base 51, to emit laser beams within different wavelength regions. Beam splitter 65 divides the beams emitted from first and second light emitting sources 61, 63. Photodetector 67 monitors the optical output from first and second light emitting sources 61, 63 by receiving the beams split by beam splitter 65 toward one direction. Cap 57 sits upon and mates with base 51, while enclosing first and second light emitting sources 61, 63, beam splitter 65 and monitoring photodetector 67.

First and second heat sinks 55 and 56 are mounted upon base 51. First light source 61, which is installed on a lateral surface of first heat sink 55, emits a beam in a vertical direction with respect to the base 51, while second light source 63, which is installed on the top surface of the first heat sink 55, emits a beam in a direction parallel to base 51 and approximately orthogonal to the beam emitted by light source 61. Monitoring photodetector 67 is installed upon a lateral surface of second heat sink 56, facing the second light source 63 with beam splitter 65 disposed between photodetector 67 and light source 63. First and second light sources 61, 63 and monitoring photodetector 67 are electrically connected to an external driver (not shown) by wire leads 53 and a plurality of terminal pins 52 installed to penetrate base 51. First and second light sources 61 and 63 may be semiconductor lasers radiating beams having different wavelengths. For example, first light source 61 may emit a beam within a wavelength region of approximately 635 to 650 nm, and second light source 63 may emit a beam within a wavelength region of approximately 780 nm.

Beam splitter 65 is positioned between first and second light sources 61, 63 and monitoring photodetector 67, to direct most of the energy of the light beams emitted from first and second light sources 61, 63 to the exterior of cap 57 through an emission hole 57a formed on the base surface of cap 57, while diverting a minority of the energy from the light beams toward monitoring photodetector 67. Preferably, emission hole 57a will be sealed by beam splitter 65.

Monitoring photodetector 67 utilizes the split beam received via beam splitter 65 that has been split from the beams emitted by first and second light sources 61, 63. In other words, part of the effective beams emitted by first and second light sources 61, 63 is used by photodetector 67 in order to monitor the beams emitted by first and second sources 61, 63. Since the beams emitted by the rear surfaces of first and second light sources 61, 63 are not used, the structure of the first and second light sources 61, 63 may be improved to attain a reflectivity of substantially 99% or more, thereby substantially enhancing the optical output efficiency of module 50. Also, since the life of a semiconductor laser is proportional to the square of the optical output thereof, the operational lifetime of module 50 may be greatly prolonged.

Figure 4:
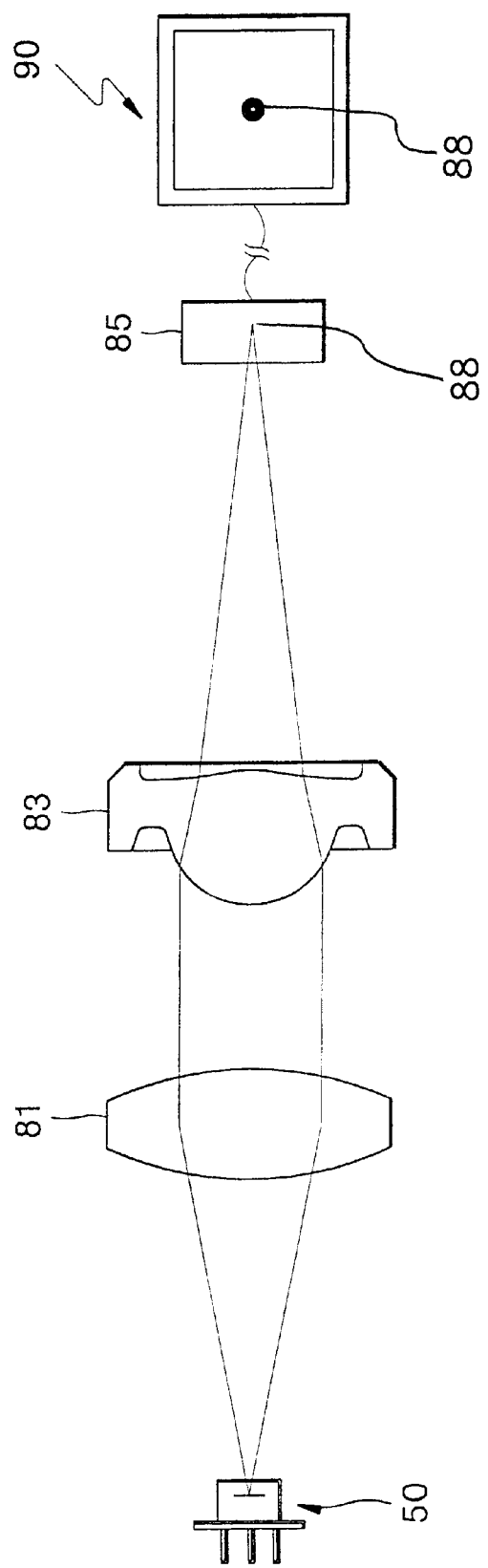
FIG. 4 is a view showing the optical arrangement of an apparatus for matching light emitting points for the first and second light sources of one light emitting module that may be used in the practice of the first embodiment of the present invention.

The system illustrated by FIG. 4 may be used with light emitting module 50 to make the points of illumination created by the beams emitted by first and second light sources 61, 63, thereby simplifying the manufacturing assembly of module 50. The beam emitted from first light source 61 of the light emitting module 50, after diverging via beam splitter 65, is enlarged and directed onto a charge coupled device (i.e., CCD) camera 85 through collimating lens 81 and focusing lens 83. Here, while the spot 88 formed on camera 85 may be observed by enlarging the spot 88 through a monitor 90 driven by camera 85, the position of first light source 61 maybe adjusted and then fixed on the lateral surface of first heat sink 55. Then, while the spot 88 formed on CCD camera 85 is observed through monitor 90, the position of second light source 63 may be adjusted to then fixed on the top surface of first heat sink 55.

Figure 5:
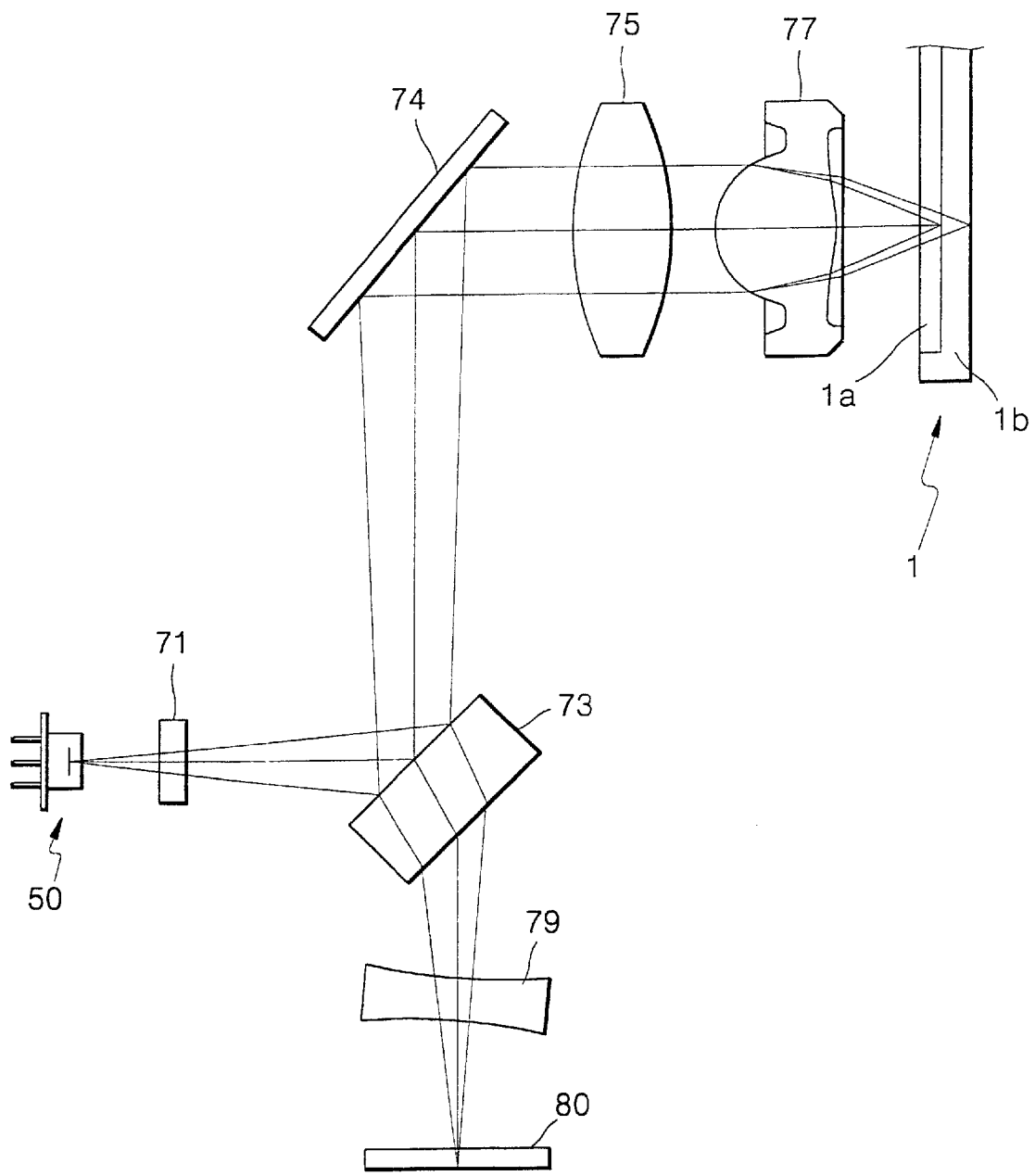
FIG. 5 is a schematic view showing the optical arrangement of a compatible optical pickup device constructed according to the principles of the present invention as the first embodiment.

Referring now to FIGS. 3 and 5, a compatible optical pickup device may be constructed according to the present invention by incorporating light emitting module 50 with first and second light sources 61, 63 integrally formed therein, an objective lens 77 that focuses the beams emitted from first and second light sources 61, 63 onto an optical recording medium 1, light path converter 73 device that converts the proceeding path of an incident beam, and a photodetector 80 receives the beams emitted from first and second light sources 61, 63 that have been reflected from optical recording medium 1 through the light path convert 73. The structure of light emitting module 50 is the same as that described with reference to FIG. 3, and any further description of module 50 is unnecessary. First light source 61 is used when a relatively thin optical disk 1a, for example, a digital versatile disk (i.e., a DVD), is employed as optical recording medium 1, to emit a laser beam within the wavelength region of approximately 635 to 650 nm. Second light source 63 is used when a relatively thick optical disk 1b, for example, a compact disk (i.e., a CD), is employed as the optical recording medium 1, to emit a laser beam within the wavelength region of approximately 780 nm.

Figure 6:
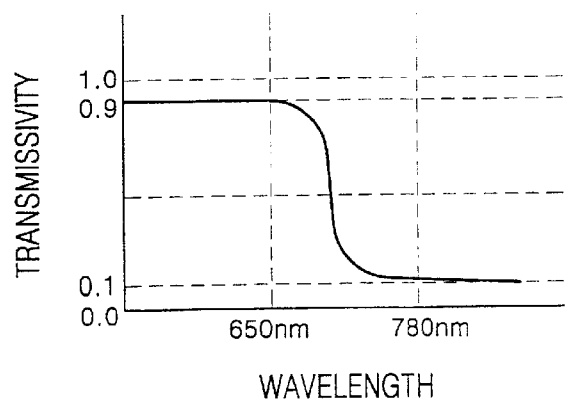
FIG. 6 is a graph showing the property of transmissivity for a beam splitter suitable for use in a light emitting module constructed as the first embodiment of the present invention.

Referring now to FIG. 6, beam splitter 65 is designed to transmit approximately 90% of a beam within the wavelength region of about 650 nm, and approximately 10% of a beam within the wavelength region of about 780 nm. That is, beam splitter 65 transmits most of the energy of the beam emitted from first light source 61 and reflects a lesser part of that beam within the 650 nanometer region. Also, beam splitter 65 reflects most of the beam emitted from second light source 63 and transmits a lesser part of that beam within the 780 nanometer region. Thus, most of the energy of the beams of light emitted from first and second light sources 61, 63 are directed towards optical recording medium 1 via beam splitter 65, and only a small part of the energy of those beams is directed to monitoring photodetector 67.

The light path converter 73 is positioned on the optical path between light emitting module 50, objective lens 77 and photodetector 80 to direct the beam emitted by light emitting module 50 toward optical recording medium 1, and to direct the beam reflected from optical recording medium 1 toward photodetector 80. The light path converter 73 is preferably a flat-panel type beam splitter, as shown in FIG. 5. A cubic beam splitter, a polarized beam splitter or a hologram device may also be employed in alternative embodiments. In order to detect a track error signal by photodetector in a three-beam technique, it is preferred that a grating 71 for diffracting and transmitting the beam emitted from light emitting module 50 into a 0th-order beam, ±1st-order beam and the like, is located within the optical path between light emitting module 50 and flat-panel type beam splitter 73. Also, optical elements including mirror 74 to reflect the incident beams and change their paths, and a collimating lens 75 that focuses and converts the incident divergent beams into a collimated beam, is located on the optical path between the flat-panel type beam splitter 73 and objective lens 77. Photodetector 80 receives and detects an information signal and a servo signal from the beams emitted from first and second light sources 61, 63 and reflected from optical recording medium 1.

An astigmatic lens 79 is preferably positioned on the optical path between flat-panel type beam splitter 73 and photodetector 80 to detect a focus error signal in an astigmatism technique. Astigmatic lens 79 is preferably positioned with an orientation that is inclined to the optical path so as to correct the aberration due to inclination of flat-panel type beam splitter 73.

In the operation of the compatible optical pickup device described in the foregoing paragraphs as the first embodiment, when a relatively thin optical disk 1a, such as a DVD, is employed as optical recording medium 1, the beam emitted from first light source 61 is utilized. In other words, most of the energy of the beam emitted from first light source 61 passes through beam splitter 65 and is then diffracted by grating 71 into at least three beams. The diffracted beams are reflected from beam splitter 73 and mirror 74, and are collimated by collimating lens 75 to be directed to objective lens 77. Objective lens 77 focuses incident beams of light to form on the surface of optical disk 1a which is relatively thin in comparison to optical disk 1b. The beams of light that may be reflected from optical disk 1a are directed to flat-panel type beam splitter 73 via objective lens 77, collimating lens 75 and mirror 74. These beams pass through flat-panel type beam splitter 73 and land on photodetector 80 via sensing lens 79. Photodetector 80 detects the information signal and focus error signal for thin optical disk 1a from the incident beam, and detects the track error signal from the beams diffracted by grating 71 and split by beam splitter 73.

The beams emitted from first light source 61 and reflected from beam splitter 65 of light emitting module 50 land on monitoring photodetector 67, and the optical output of first light source 61 is controlled by an optical output control circuit (not shown) disposed between first light source 61 and monitoring photodetector 67.

When a relatively thicker optical disk 1b such as a compact disk is employed as an optical recording medium 1, the beam emitted by second light source 63 is utilized. Most of the energy in the beam emitted by second light source 63 is reflected by beam splitter 65 and directed toward optical recording medium 1. When compared to the beam emitted from first light source 61, the operation of the beam is substantially the same except for a fact that the beam emanating from light source 63 is focused by objective lens 77 onto the relatively thicker optical disk 1b, so that a detailed description will be omitted. The beam emitted from second light source 63 transits beam splitter 65 and is focused on monitoring photodetector 67. The optical output from second light source 63 is controlled by an optical output control circuit (not shown) connected between second light source 61 and monitoring photodetector 67.

The first embodiment of the light emitting module and the compatible optical pickup device described by the foregoing paragraphs provide remarkable advantages. First, since first and second light sources are installed in a single optical module, the assembly of an optical pickup device is simplified in comparison to a DVD- or CD-dedicated optical pickup device. Second, since a photodetector is used to monitor plural wavelengths, the circuitry of the optical output controller is simplified. Third, since the monitoring photodetector utilizes only a very minor part of the effective beams of light emitted from the first and second light sources, optical outputs from the rear surfaces of the first and second light sources are not necessary. Consequently, the optical output efficiency can be greatly increased by changing the structures of the light sources in accordance with the foregoing principles.

Figure 7:
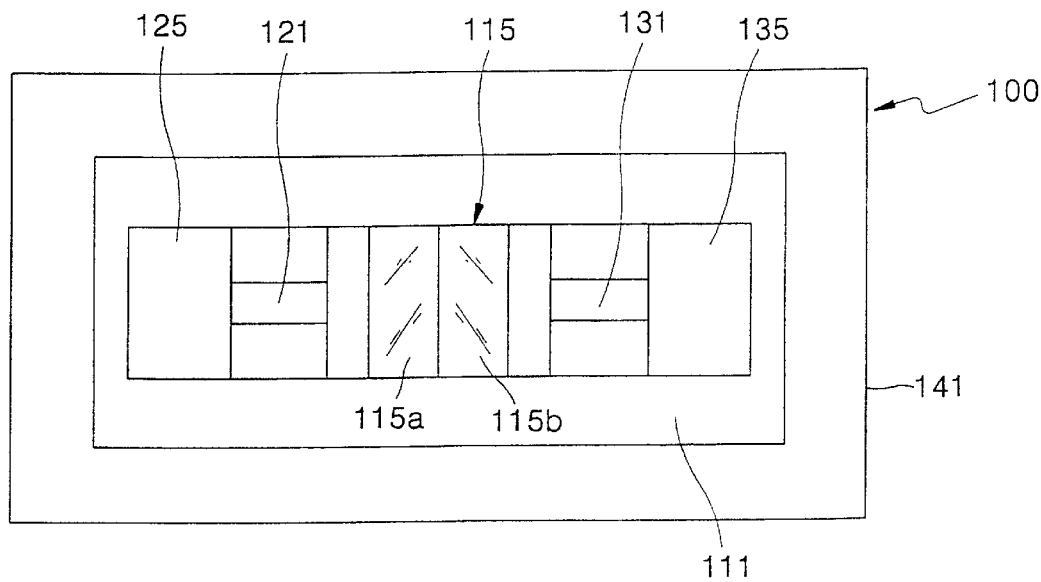
FIG. 7 is a plan view showing the optical arrangement of a light emitting module constructed as a second embodiment of the principles of the present invention.
Figure 8:
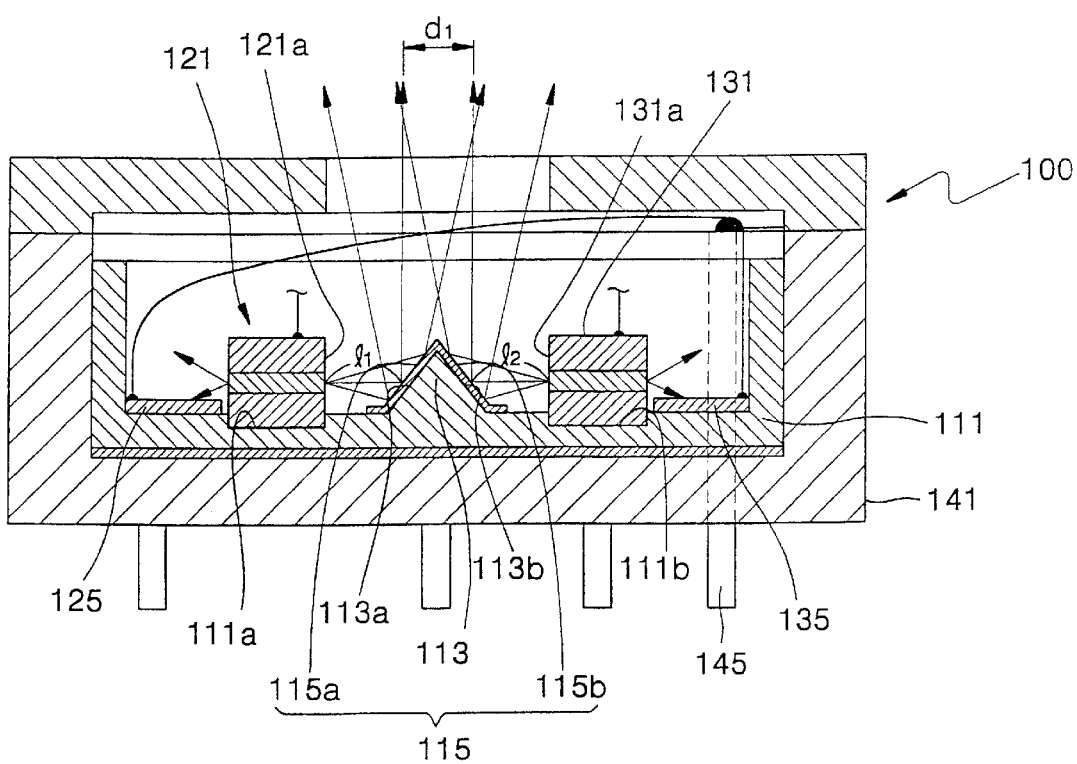
FIG. 8 is a sectional view showing a light emitting module constructed as the second embodiment of the present invention.

Referring now to FIGS. 7 and 8, a light emitting module 100 may be constructed as a second embodiment of the present invention with a substrate 111, first and second light emitting sources 121, 131 are mounted upon substrate 111 to emit laser beams within different wavelength regions, and a reflector 115 that allows the light emitted from first and second light emitting sources 121, 131 to proceed in a single direction. First and second photodetectors 125, 135 monitor the optical light beams from first and second light emitting sources 121, 131, respectively, in response to the light received from first and second light emitting sources 121, 131. A frame 141 encases substrate 111 to form a packaged module with a plurality of electrical leads 145 enabling operational coupling of the several components of module 100 to external circuitry. Substrate 111 may be formed of a silicon material and forms an inner cavity where first and second light emitting sources 121, 131 and first and second monitoring photodetectors 125, 135 may be installed. This cavity may be formed by etching into the silicon of substrate 111. First light emitting source 121 is installed within the inner space of substrate 111 and emits a laser beam of a predetermined wavelength, for example, 650 nm, from both of its lateral sides. The light beams are emitted from first light emitting source 121 in two opposite directions, with the light in one direction proceeding toward reflection member 115 while the light emitted in the opposite direction proceeding towards first monitoring photodetector 125. Second light emitting source 131 is also installed within substrate 111, but is separated a predetermined distance from first light emitting source 121. Second light source 131 emits a laser beam exhibiting a predetermined wavelength, for example, of 780 nm, in two opposite directions from both lateral sides. The light beam propagated in one direction by second light source 131 proceeds toward reflection member 115 while the light beam propagated in the opposite direction proceeds toward second monitoring photodetector 135.

Preferably, a pair of guide grooves 111a and 111b are formed as indents within the floor of the inner space of substrate 111, to guide first and second light emitting sources 121, 131 into their respective positions. Light sources emitting 121, 131 are attached to substrate 111 with these indents. These indents accurate position light emitting sources 121, 131 and minimizing the risk of any error in the siting of first and second light emitting sources 121, 131 with respect to substrate 111. Consequently, the amount of relative shift of the optical axes of first and second light emitting sources 121, 131 can be accurately controlled.

Reflector 115 is installed on the floor of the cavity etched into substrate 111, between first and second light emitting sources 121, 131, and deflects the laser beams emitted from the facing, albeit oppositely directed end sides of each of first and second light emitting sources 121, 131 in a single direction. Reflection member 115 may be integrally formed as a monolithic feature of substrate 111, as a prism 113 with a base that is nominally coextensive with the floor of the cavity etched into substrate 111, and with first and second surfaces 113a, 113b oriented at an inclined, predetermined angle with respect to each of first and second light emitting sources 121, 131. First and second reflective regions 115a, 115b are respectively formed at first and second surfaces 113a, 113b to reflect light emanating from the facing end sides of first and second light emitting sources 121, 131.

Triangular prism 113 is formed by preferentially etching substrate 111 while forming the inner cavity. Preferably, the angles between first surface 113a and the floor of substrate 111, and second surface 113b and the floor of substrate 111, are both 45°. Silicon, selected as a material for substrate 111, has a crystalline structure of a cubic shape; consequently, etching at angles of 45° is easy. First and second reflective regions 115a, 115b are preferably formed by deposit of a reflection coating onto first and second surfaces 113a, 113b of prism 113. Thus, the two oppositely directed light beams emitted from first and second light emitting sources 121, 131 are respectively reflected by first and second reflective regions 115a, 115b, and proceed parallel to each other while maintaining a distance $d_1$ between their corresponding optical axes of their beams.

Also, it is preferable that length $l_2$ of the optical axis between exhaust surface 131a of second light source 131 and reflective region 115 be arranged to be relatively greater than length $l_1$, of the optical axis between exhaust surface 121a of first light emitting source 121 and reflective region 115 in order to compensate for the change in the size of the section of the exhaust light due to the difference in wavelength of the exhaust light when the light is emitted from the first and second light sources 121, 131 and passes through the optical elements positioned along the optical path.

First and second photodetectors 125, 135 are respectively positioned on the floor of the cavity etched into substrate 111, to receive lights emitted from the oppositely directed, non-facing end surfaces of first and second light emitting sources 121, 131 in order to monitor the optical output of first and second light emitting sources 121, 131. First and second photodetectors 125, 135 are preferably manufactured through a semiconductor process by depositing a p-type semiconductor layer and an n-type semiconductor layer at the corresponding positions on substrate 111. It is also possible to manufacture first and second photodetectors 125, 135 through the semiconductor process with an additional substrate (not shown), and to attach the resulting photodetectors 125, 135 on the side wall of the cavity etched into substrate 111.

Frame 141 forms a package that encases substrate 111, first and second light emitting sources 121, 131, reflective member 115, and first and second photodetectors 125, 135, and incorporates them into a single module 100. Frame 141 may be formed from a material such as molding resin. Terminal lead pins 145 penetrate frame 141, and the ends of different pins 145 are wire-bonded to first and second light emitting sources 121, 131 and first and second monitoring photodetectors 125 and 135. Pins 145 include one lead for grounding substrate 111, two leads for providing driving voltages to each of first and second light emitting sources 121, 131, and one lead for transmitting electric signals detected by first and second monitoring photodetectors 125, 135. First and second light sources 121 and 131 may be selectively driven; consequently, it is possible to commonly use a single lead with respect to first and second monitoring photodetectors 125, 135.

Figure 9:
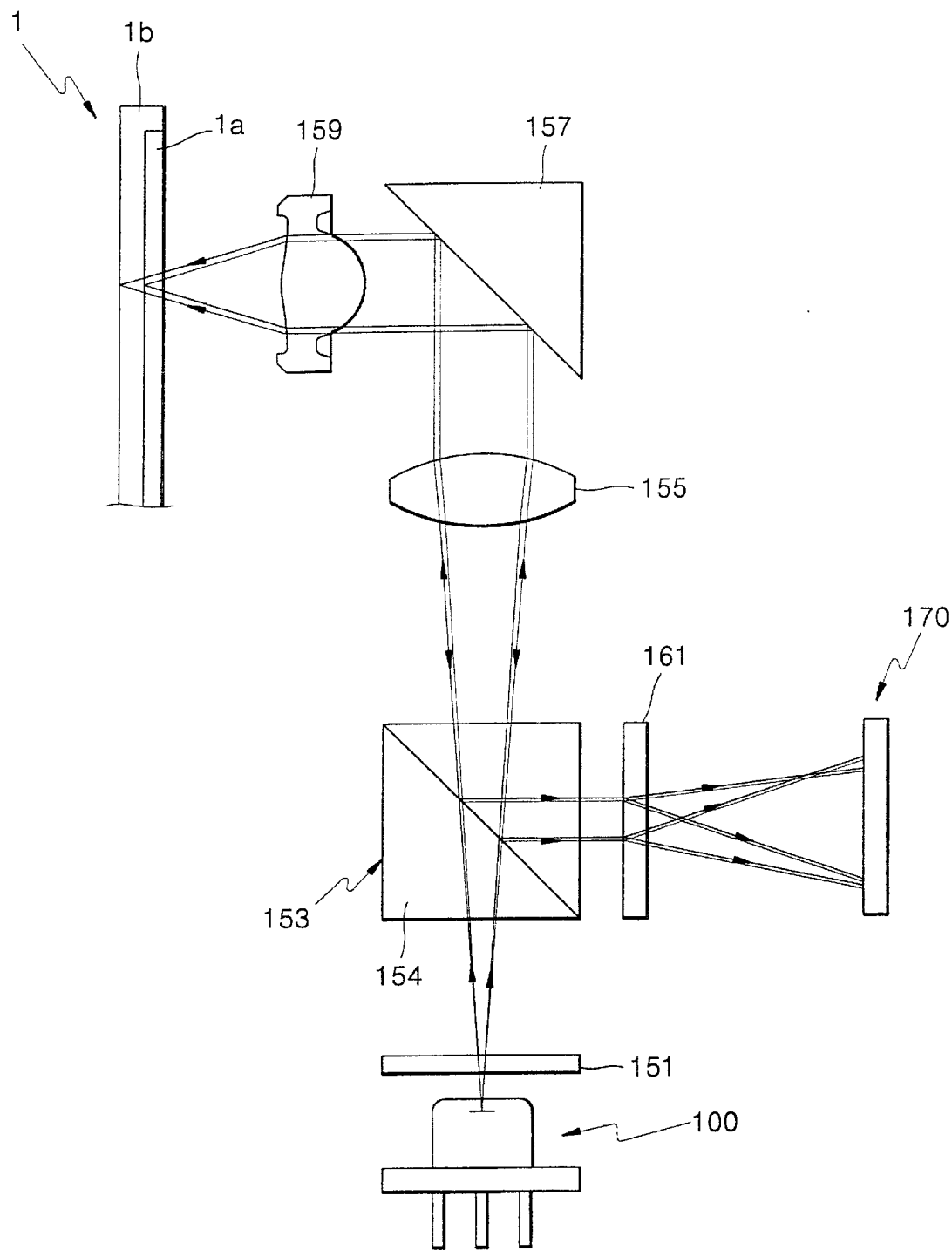
FIG. 9 is a schematic view showing the optical arrangement of a compatible optical pickup device constructed according to the principles of the present invention as the second embodiment.
Figure 10:
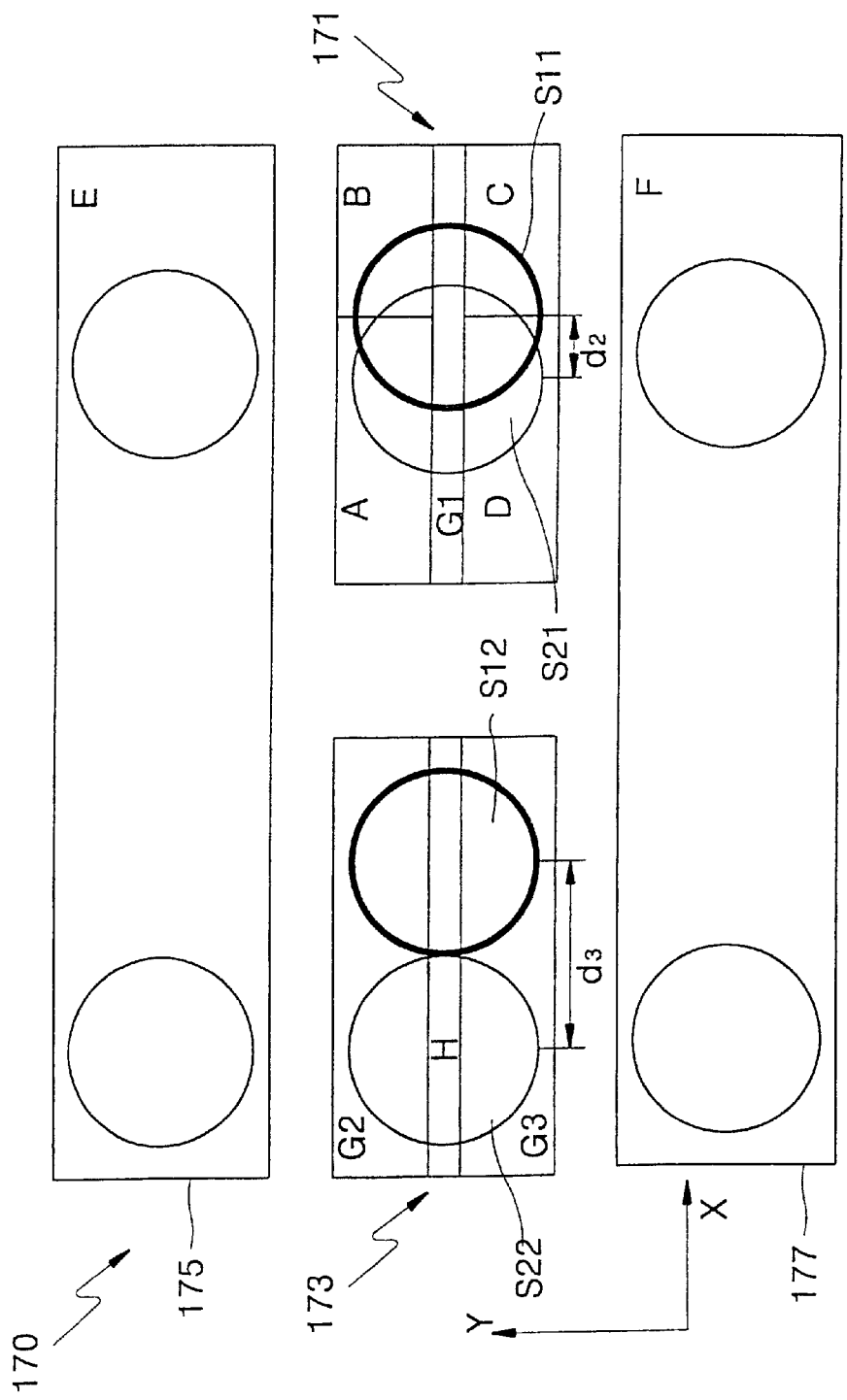
FIG. 10 is a view showing the optical arrangement of a photodetector that may be incorporated into the compatible optical pickup device constructed as the second embodiment.

Referring now to FIGS. 9 and 10, a compatible optical pickup device constructed as a second embodiment of the present invention uses light emitting module 100 and an objective lens 159 to focus the beam of light emitted from light emitting module 100 onto an optical recording medium 1. An optical path converting device 153 divides the path of the incident light, while a grating 151 positioned within the optical path between light emitting module 100 and optical path converting device 153 diffracts and transmits the incident light beam emanating from module 100. Photodetector 170 receives the incident light that has been emitted from light emitting module 100, reflected by optical recording medium 1 and passed by optical axis converting device 153, and holographic device 161 positioned on the optical axis between optical path converting device 153 and photodetector 170. Light emitting module 100 is the same as described by the details of FIGS. 7 and 8.

First light source 121 is used when a relatively thinner optical disk 1a, for example, a DVD, is adopted, and emits a light beam of about 635 through 650 nm. Second light source 131 is used when a relatively thicker optical disk 1b, for example, a CD, is adopted, and emits a light beam of about 780 nm. Preferably, first and second light sources 121 and 131 are arranged so that the length $l_2$ of the optical axis between the exhaust surface of second light source 131 and reflective member 115 is relatively greater than the length $l_1$ of the optical axis between the exhaust surface of first light source 121 and reflective member 115.

Grating 151 is positioned on the optical axis between light emitting module 100 and optical path converting device 153, to diffract and transmit incident light, and in particular, the light emitted from second light source 131 into the 0th-order light, the ±1st-order light, and the like. Accordingly, a track error signal for the light reflected by the relatively thicker optical recording medium 1b can be detected with a three-beam method.

Optical path converting device 153 is configured with a beam splitter 154 of the same structure described above. The beam splitter 154 converts a proceeding path of the light so that the light emitted from light emitting module 100 to proceed toward optical recording medium 1 and the light reflected by optical recording medium 1 to proceed toward photodetector 170.

The holographic device 161, arranged on the optical axis between beam splitter 154 and photodetector 170, diffracts and transmits the incident light into +1st-order light and −1st-order light. As +1st-order light and −1st-order light separated by holographic device 161 are focused onto different focal points, an astigmatism technique is used for detecting and generating a focus error signal. That is, during on-focus, the +1st-order light diffracted and transmitted by holographic device 161 focuses in front of photodetector 170. The −1st-order light focuses at the rear of photodetector 170. Here, the diffraction direction at grating 151 and the diffraction direction at holographic device 161 are preferably arranged to form a right angle.

Photodetector 170 includes first through fourth photodetectors 171, 173, 175 and 177 configured with ten split plates, each independently performing photoelectric conversion. First and second photodetectors 171 and 173, arranged to be separated by a predetermined distance, receive the light diffracted by grating 151 into the 0th- order light and diffracted again into the +1st-order light and the −1st-order light at holographic device 161. To detect a track error signal (TES) with respect to the relatively thin optical recording medium 1a in a phase difference method, first photodetector 171 includes four split plates A, B, C and D having an arrangement of 2×2 and one split plate G1 arranged between split plates A and B, and split plates C and D. Here, the boundary portion between split plates A and D and split plates B and C of first photodetector 171 is positioned to correspond to the portion where the center of an optical spot S11 that is focused on first photodetector 171 passes.

The second photodetector 173 includes three split plates G2, H and G3 to detect a focus error signal (FES) through differentiation with the signal detected by first photodetector 171. Three and fourth photodetectors 175, 177, arranged to be separated a predetermined distance from each other with respect to first and second photodetectors 171, 173, receive the light diffracted by grating 151 into the +1st-order light and −1st-order light and diffracted again into the +1st-order light and −1st-order light at holographic device 161, respectively.

The light received by first photodetector 171, optical spot S11 emitted from first light emitting source 121, is focused to be separated by a predetermined distance $d_2$ from an optical spot S21 emitted from second light source 131 and focused. As to the light received by second photodetector 173, an optical spot S12 emitted from first light source 121 is focused to be separated a predetermined distance $d_3$ from an optical spot S22 emitted and focused from second light source 131, because first and second light sources 121, 131 are arranged to be separated a distance $d_1$ from each other with respect to substrate 111 and a difference in the diffracting angle according to the wavelength occurs at holographic device 161. In particular, the difference between distances $d_2$ and $d_3$ occurs because, in a case of the +1st-order light, the shift amount of two lights is less than a case of −1st-order light as light with a 780 nm wavelength has a diffracting angle that is greater than that of light with a 650 nm wavelength.

First through fourth photodetectors 171, 173, 175 and 177 obtain through addition and subtraction the track error signal, the focus error signal and an information signal with respect to two optical recording mediums 1a and 1b having the different thicknesses, for example, a DVD and a CD, as follows.

DVD focus error signal=$(G_1+G_2+G_3)-(A+B+C+D+H)$ (1)

DVD track error signal=$(A+C)_{PHASE}-(B+D)_{PHASE}$ (2)

CD focus error signal=$(G_1+G_2+G_3)-(A+B+C+D+H)$ (3)

CD track error signal=$E-F$ (4)

DVD, CD information signal=$A+B+C+D+G+H$ (5)

It is preferable that an optical pickup device constructed according to the present invention further include optical elements such as a mirror 157 arranged on the optical axis between beam splitter 154 and objective lens 159 for converting the optical path by reflecting the incident light, and a collimating lens 155 for creating a parallel beam by focusing divergent light which is input.

In the operation of the compatible optical pickup device having the above structure, when relatively thin optical disk 1a such as a DVD is adopted as optical recording medium 1, the light emitted from first light emitting source 121 is used. That is, light emitted from first light emitting source 121 transmits a beam to beam splitter 154 and collimating lens 155 makes a parallel beam that is reflected by mirror 157 toward objective lens 159. Objective lens 159 focuses the incident light onto relatively thinner optical disk 1a. The light reflected by optical disk 1a passes through objective lens 159, mirror 157 and collimating lens 155, and proceeds to beam splitter 154. The light is reflected by beam splitter 154 is diffracted by holographic device 161 into the +1st-order light and −1st-order light and is focused on first through four photodetectors 171, 173, 175 and 177. First through four photodetectors 171, 173, 175 and 177 detect, from the incident light, the information signal with read from relatively thinner optical disk 1 a, the track error signal derived by the phase difference technique, and the focus error signal obtained by the astigmatism technique through holographic device 161.

The light emitted from the rear end surface of first light emitting source 121 focuses on first monitoring photodetector 125 so that the optical output of first light source 121 is controlled by an optical output control circuit (not shown) that is operationally coupled between first monitoring photodetector 125 and first light emitting source 121.

When relatively thicker optical disk 1b such as a CD is adopted as the optical recording medium 1, the light emitted from second light source 131 is used. That is, light emitted from second light emitting source 131 is transmitted by beam splitter 154 after being diffracted into at least three beams by grating 151, and proceeds to optical recording medium 1. The beams of light are focused by objective lens 159 onto the relatively thicker optical disk 1b and then reflected from disk 1b and passed by objective lens 159, beam splitter 154 and holographic device 161 to focus onto first through fourth photodetectors 171, 173, 175 and 177. First through four photodetectors 171, 173, 175 and 177 detect, from the incident light, the information signal that was read from the relatively thicker optical disk 1b, the track error signal derived by the three beam technique, and the focus error signal obtained by the astigmatism technique with holographic device 161.

The light emitted by the rear end surface of second light source 131 and transmitted by beam splitter 154 is focused on second monitoring photodetector 135 so that the optical output of second light source 131 is controlled by an optical output control circuit (not shown) that is operationally coupled between second monitoring photodetector 135 and second light source 131.

The light emitting module and the compatible optical pickup device adopting the same according to the present invention constructed with this structure provides several advantages over contemporary practice in the art. First, because the first and second light emitting sources are installed in a single optical module, the assembly of the optical pickup device is simplified like a single DVD- or CD-dedicated optical pickup device. Second, as the optical output signal obtained by the monitoring photodetector provided with respect to a plurality of wavelengths is used as a single optical output control signal, wiring of the optical output control circuit is also simplified.

What is claimed is:

1. A light emitting module, comprising:
    a base mounted within said module, providing a lateral surface and a top surface;
    first and second light sources installed on the base within said module to emit laser beams in different wavelength regions, with the first and second light sources respectively mounted on said lateral surface and on said top surface;
    a beam splitter positioned between said first and second light sources, dividing the beams emitted from the first and second light sources; and
    a photodetector located within said module, monitoring the optical outputs of at least one of the first and second light sources by receiving the beams emitted from the first and second light sources and split from the beam splitter in one direction.

2. A light emitting module, comprising:
    a base;
    a heat sink positioned on said base, with said heat sink providing a lateral surface and a top surface;
    first and second light sources installed on the base to emit laser beams in different wavelength regions, with the first and second light sources respectively mounted on said lateral surface and on said top surface;
    a beam splitter positioned between said first and second light sources, dividing the beams emitted from the first and second light sources; and
    a photodetector monitoring the optical outputs of the first and second light sources by receiving the beams emitted from the first and second light sources and split from the beam splitter in one direction.

3. The light emitting module as claimed in claim 2, further comprising a cap having an emission hole through which the beams emitted from the first and second light sources and split from the beam splitter in different directions are emitted, installed on the base to enclose the first and second light sources, the beam splitter and the monitoring photodetector.

4. The light emitting module as claimed in claim 3, wherein the emission hole of the cap is sealed by the beam splitter.

5. A compatible optical pickup device, comprising:
    a light emitting module having a base, first and second light sources installed on the base, to emit laser beams in different wavelength regions, a beam splitter dividing the beams emitted from the first and second light sources, and a photodetector monitoring the optical outputs of the first and second light sources by receiving the beams emitted from the first and second light sources and split from the beam splitter in one direction;
    a heat sink positioned on the base, with the first and second light sources mounted on a lateral surface of and on a top surface of the heat sink;
    an objective lens disposed on the optical path between the light emitting module and an optical recording medium, for focusing the beams emitted from the first and second light sources onto the optical recording medium;
    an optical path converting device disposed on the optical path between the light emitting module and the objective lens, converting the proceeding path of an incident beam; and
    a photodetector receiving the beams emitted from the first and second light sources, reflected from the optical recording medium and input via the optical path converting device.

6. The compatible optical pickup device as claimed in claim 5, further comprising a cap having an emission hole through which the beams emitted from the first and second light sources and split from the beam splitter in different directions are emitted and installed on the base to enclose the first and second light sources, the beam splitter and the monitoring photodetector.

7. The compatible optical pickup device as claimed in claim 6, wherein the emission hole of the cap is sealed by the beam splitter.

8. A light emitting module, comprising:
    a substrate;
    a first light source, installed on the substrate, for emitting a laser beam of a wavelength from both lateral sides thereof;
    a second light source, installed on the substrate being separated by a predetermined distance from the first light source, emitting a laser beam of a wavelength different from that of the laser beam emitted from the first light source from both lateral sides thereof;
    a reflection member, arranged on the substrate between the first light source and the second light source, reflecting the laser beam emitted from one lateral side of each of the first and second light sources to proceed in one direction;
    first and second monitoring photodetectors receiving the laser beam emitted from the other lateral side of each of the first and second light sources and monitoring optical outputs of the first and second light sources;
    a package frame encompassing the substrate, the first and second light sources, the reflection member and the first and second photodetectors; and
    a lead frame formed by penetrating the package frame and wire-bonded to the first and second light sources and the first and second monitoring photodetectors.

9. The light emitting module as claimed in claim 8, wherein the reflection member comprises:
    a base integrally formed with the substrate and including first and second surfaces having a predetermined degree of inclination; and
    first and second reflection portions, respectively formed at the first and second surfaces, reflecting the incident lights emitted from the first and second light sources.

10. The light emitting module as claimed in claim 8, wherein the first and second light sources emit laser beams of about 650 nm and 780 nm wavelengths, respectively, and the first and second light sources are arranged such that the length on an optical axis between an exhaust surface of the second light source and the reflection member is relatively greater than the length on an optical axis between an exhaust surface of the first light source and the reflection member.

11. The light emitting module as claimed in claim 8, wherein, in the substrate, a pair of guide grooves guiding the position where the first and second light sources are attached is formed to be indented at the positions where the first and second light sources are attached.

12. The light emitting module as claimed in claim 8, further comprising an emission hole through which the light emitted from the first and second light sources and reflected by the reflection member is emitted, and a cap installed on the package frame to encompass the first and second light sources, the reflection member and the first and second monitoring photodetectors.

13. A compatible optical pickup device, comprising:

a light emitting module including a substrate, first and second light sources installed on the substrate emitting laser beams of first and second wavelengths from both lateral sides thereof, a reflection member arranged on the substrate between the first and second light sources reflecting the laser beam emitted from one lateral side of each of the first and second light sources to proceed in one direction, and first and second monitoring photodetectors receiving the laser beam emitted from the other lateral side of each of the first and second light sources and monitoring optical outputs of the first and second light sources;

an objective lens arranged on an optical path between the light emitting module and an optical recording medium focusing the incident first and second laser beams on the optical recording medium;

an optical path converting device arranged on an optical path between the light emitting module and the objective lens converting a proceeding path of an incident light;

a grating arranged on an optical path between the light emitting module and the optical path converting device diffracting and transmitting an incident light;

a photodetector receiving an incident light emitted from the first and second light sources and reflected by the optical recording medium and passing the optical path converting device; and a holographic device arranged on an optical path between the optical path converting device and the optical output device diffracting and transmitting an incident light.

14. The compatible optical device as claimed in claim 13, wherein the reflection member comprises:

a base integrally formed with the substrate and including first and second surfaces having a predetermined degree of inclination; and first and second reflection portions, respectively formed at the first and second surfaces, for reflecting the incident lights emitted from the first and second light sources.

15. The compatible optical device as claimed in claim 13, wherein the first and second light sources emit laser beams of about 650 nm and 780 nm wavelengths, respectively, and the first and second light sources are arranged such that the length on an optical axis between an exhaust surface of the second light source and the reflection member is relatively greater than the length on an optical axis between an exhaust surface of the first light source and the reflection member.

16. The compatible optical device as claimed in claim 13, wherein, in the substrate, a pair of guide grooves guiding the position where the first and second light sources are attached is formed to be indented at the positions where the first and second light sources are attached.

17. The compatible optical device as claimed in claim 13, wherein the grating and the holographic device are arranged such that the diffraction directions of the light diffracted by each of the grating and the holographic device forms a right angle, and the photodetector comprises:

first and second photodetectors, arranged to be separated a predetermined distance, receiving lights diffracted by the grating into the 0th-order light and diffracted again into the +1st-order light and the −1st-order light at the holographic device, respectively; and third and fourth photodetectors, arranged to be separated a predetermined distance with respect to the first and second photodetector, for receiving lights diffracted by the grating into the +1st-order and −1st-order lights and diffracted again into the +1st-order light and the −1st-order light by the holographic device, respectively.

18. The compatible optical device as claimed in claim 17, wherein, to detect a track error signal in a phase difference method, the first photodetector comprises four split plates having an arrangement of 2×2 and one split plate arranged between a first pair of said four split plates and a remaining pair of said four split plates, and the second photodetector comprises three split plates disposed to detect a focus error signal (FES) by differentiation with a signal detected by the first photodetector.

19. A light emitting process, comprising:

providing a base providing a lateral surface and a top surface within a module;

installing first and second light sources on the base to emit laser beams exhibiting different wavelengths, with the first and second light sources respectively mounted on said lateral surface and on said top surface;

positioning a beam splitter between said first and second light sources, to divide the beams emitted from the first and second light sources; and monitoring the optical outputs of the first and second light sources by positioning a photodetector within said module to receive the beams emitted from the first and second light sources and split from the beam splitter onto said photodetector.

20. A light emitting process, comprising:

assembling a light emitting module comprised of a substrate, first and second light sources installed on the substrate to selectively emit laser beams of first and second wavelengths from both lateral sides thereof, a reflection member arranged on the substrate between the first and second light sources to reflect the laser beam emitted from one lateral side of each of the first and second light sources to proceed in one direction, and at least one photodetector positioned within the module to receive the laser beam emitted from the other lateral side of at least one of the first and second light sources;

arranging an objective lens on an optical path between the light emitting module and an optical recording medium to focus incident first and second laser beams on the optical recording medium; and detecting error occurring along said optical path.

21. The light emitting process of claim 20, further comprised of detecting said error by sensing a focus error signal from said laser beams of first and second wavelengths and from beams reflected from the optical recording medium.

22. The light emitting process of claim 20, further comprised of obtaining a focus error signal, an information signal and a servo signal from said laser beams of first and second wavelengths and from beams reflected from the optical recording medium.

* * * * *